C. S. KIERSTEAD.
APPARATUS FOR TREATING VEGETABLES.
APPLICATION FILED MAR. 31, 1906.

901,011.

Patented Oct. 13, 1908.
2 SHEETS—SHEET 2.

WITNESSES
Alfred H. Hildreth
Farnum F. Dorsey

INVENTOR
Charles S. Kierstead
by his Attorneys
Phillips Van Everen & Fish

UNITED STATES PATENT OFFICE.

CHARLES S. KIERSTEAD, OF CAMBRIDGE, MASSACHUSETTS.

APPARATUS FOR TREATING VEGETABLES.

No. 901,011.

Specification of Letters Patent.

Patented Oct. 13, 1908.

Application filed March 31, 1906. Serial No. 309,040.

*To all whom it may concern:*

Be it known that I, CHARLES S. KIERSTEAD, a subject of the King of Great Britain, residing at Cambridge, in the county of Middlesex and State of Massachusetts, have invented certain new and useful Improvements in Apparatus for Treating Vegetables; and I do hereby declare the following to be a full, clear, and exact description of the invention, such as will enable others skilled in the art to which it appertains to make and use the same.

The present invention relates to an apparatus for mashing and mixing vegetables such as potatoes, turnips, and the like.

An object of the invention is to provide an improved means for quickly and thoroughly mashing the vegetables.

Another object of the invention is to provide means whereby the vegetables can be mashed and thoroughly mixed at one operation so that the vegetables can be prepared for the table in a short space of time after they are taken from the steamer, boiler, or other cooking utensil, and before they have an opportunity to cool.

With these objects in view the invention consists in the improved apparatus hereinafter described and claimed.

Figure 1:
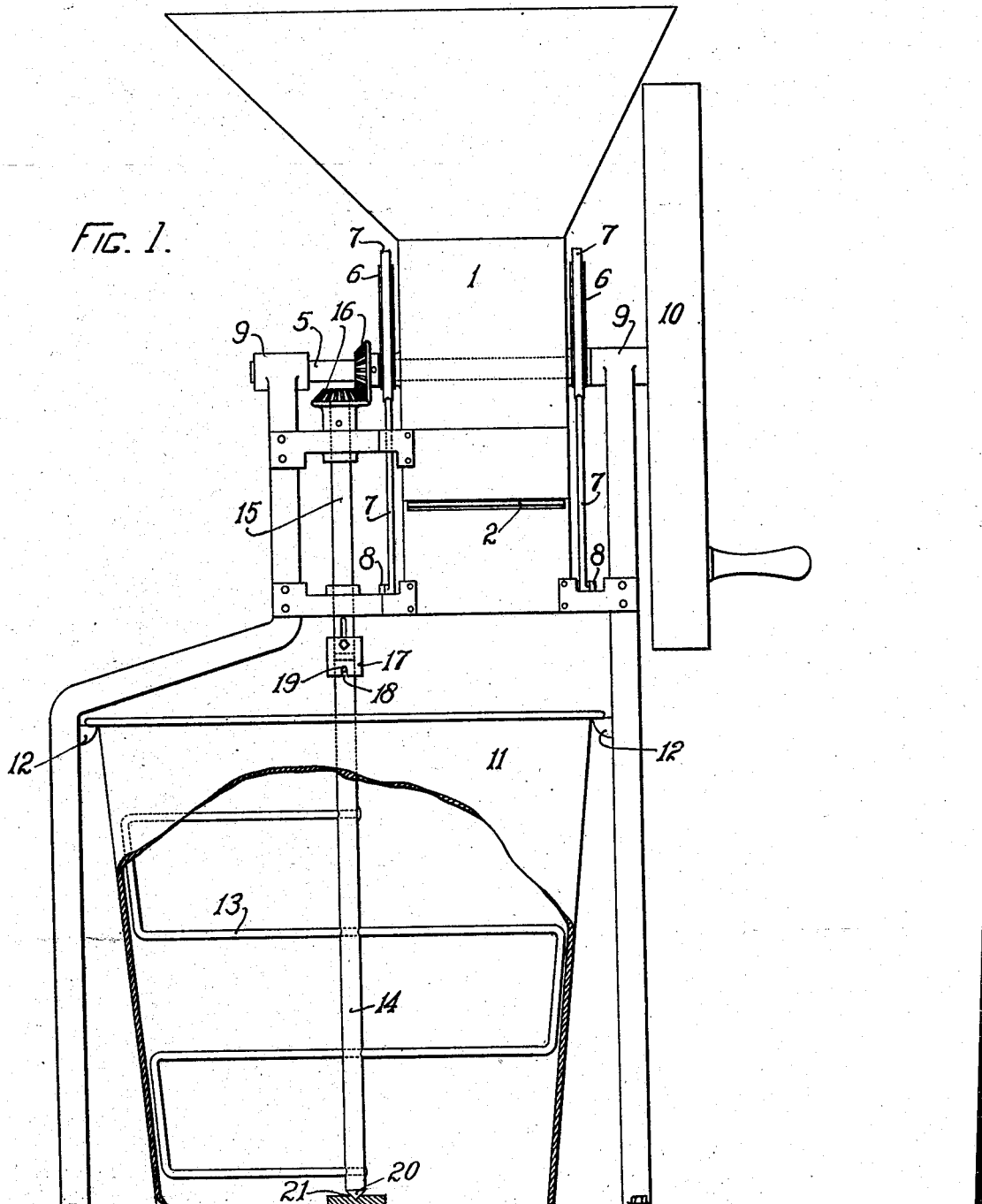
Figure 2:
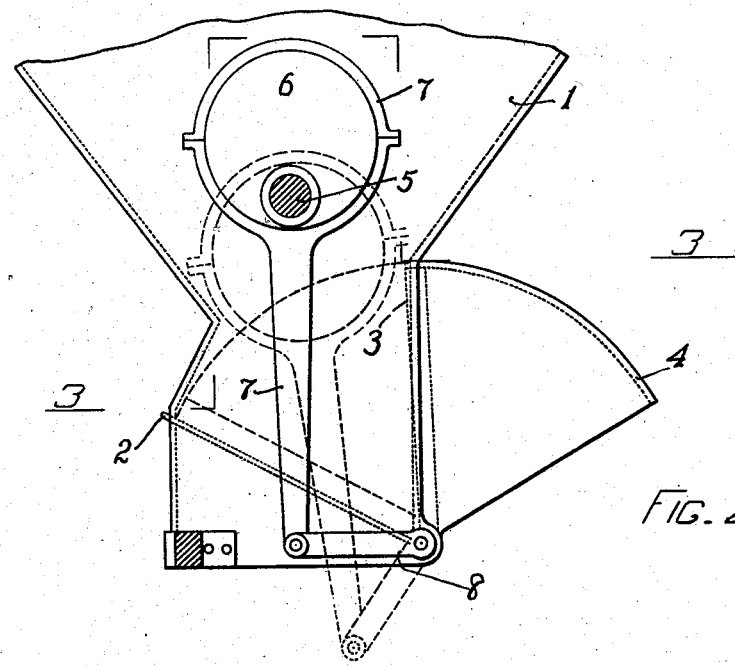
Figure 3:
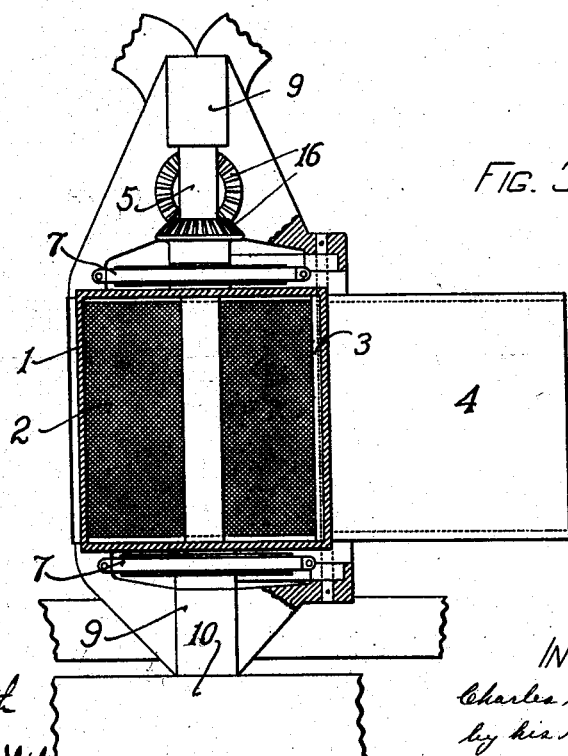

The several features of the present invention will be clearly understood from an inspection of the accompanying drawings in which Figure 1 is a view in front elevation of an apparatus embodying the same in their preferred form, a portion of the mixing vessel being broken away to show the construction and arrangement of the stirrer therein. Fig. 2 is a detail view in side elevation of a portion of the hopper, illustrating particularly the arrangement of the screen and plunger and the mechanism for actuating the plunger, and Fig. 3 is a detail sectional plan view taken on a plane indicated by the line 3—3 on Fig. 2.

The machine illustrated in the drawings comprises a hopper into which the vegetables to be treated are placed in bulk, a screen in the lower portion of the hopper, a plunger movable towards and from the screen to force the vegetables through the screen and thereby thoroughly mash them, a mixing vessel arranged to receive the mashed material as it is delivered from the hopper, a stirrer for thoroughly mixing the material after it reaches the mixing vessel, and connected mechanism for actuating the plunger and stirrer.

The hopper is indicated at 1 and comprises an upper portion provided with flaring walls and a lower portion provided with vertical walls. The screen is indicated at 2 and is arranged in an inclined position in the lower portion of the hopper, as best illustrated in Fig. 2. To enable the screen to be readily cleaned it is preferably made removable, and to this end the netting forming the screen is secured to a rectangular frame which frame is mounted to slide in inclined guideways formed in opposite walls of the lower portion of the hopper.

At its upper end the frame of the screen projects beyond the wall of the hopper, as indicated in Fig. 2, so as to be readily grasped when it is desired to remove the screen. The plunger which coöperates with the screen to mash the vegetables is indicated at 3 and consists of a plate pivotally mounted at its lower end between two walls of the hopper at the lower end of the screen 2. This plate operates through an opening in one of the walls of the lower portion of the hopper, and is adapted to swing from a substantially vertical position to an inclined position in which latter position it rests against the screen 2, as indicated in dotted lines in Fig. 2.

Projecting outwardly from the plate 3 are two side plates which operate close to the adjacent walls of the lower portion of the hopper, and a top plate which moves in close proximity to the upper edge of the opening in the wall of the hopper for the plate 3. This top plate is indicated in Fig. 2 at 4 and, as will be apparent from an inspection of this figure, acts to support the material in the upper portion of the hopper as the plate 3 moves towards the screen. The plunger thus acts at each forward movement to cut off a portion of the material in the hopper and force this portion of the material through the screen. Oscillating movements toward and from the screen 2 are imparted to the plunger from a shaft 5, passing through the upper portion of the hopper, by means of eccentrics 6 secured to the shaft, eccentric straps and links 7, and arms 8 projecting from the pivot of the plunger and connected at their free ends to the lower ends of the links 7. The shaft 5 is journaled in bearings in the upper portion of the side standards 9 of the frame, and is provided at one end with a hand wheel 10 by which the shaft can be rotated. By means of this construction the plunger is moved continuously towards and from the screen as the shaft is rotated, and at each movement of the plunger towards the screen a portion of the material in the hopper is cut off from the remaining portion and forced through the screen.

The mixing vessel is indicated at 11 and, as is indicated in Fig. 1, is arranged beneath the hopper so as to receive the mashed material as it is forced through the screen. This mixing vessel is located between the side standards of the machine frame and is removably held in position by means of lugs 12 on the side standards 9, which project beneath a flange on the upper edge of the mixing vessel. Arranged within the mixing vessel is a stirrer 13 which, as shown, consists of a series of paddles formed by a rod bent into suitable shape and secured to a vertical shaft 14, the arrangement of the shaft and stirrer being such that a rotation of the shaft rotates the stirrer within the mixing vessel and thoroughly mixes the mashed material which has fallen into the vessel. The shaft 14 is rotated through suitable connections from the shaft 5, and to this end it is journaled at its lower end in the bottom of the mixing vessel and at its upper end is connected to a vertical shaft 15 which is driven from the shaft 5 by means of bevel gears 16. To enable the mixing vessel to be removed the shaft 14 is removably connected to the shaft 15 by means of a coupling sleeve 17. The sleeve 17 is mounted upon the lower end of the shaft 15 so as to be rotated therewith, and be capable of moving longitudinally thereon. At its lower end the sleeve is provided with a notch 18 adapted to engage a pin 19 projecting from the shaft 14. By means of this construction the shafts 14 and 15 are connected so as to rotate together when the sleeve is in its lowest position, but the shafts can be readily disconnected by raising the sleeve 17 until the notch 18 is disengaged from the pin 19. To enable the stirrer to be removed from the mixing vessel the shaft 14 is journaled in the bottom of the mixing vessel as indicated in Fig. 1, the lower end of the shaft being provided with a tapered portion 20 which enters a correspondingly shaped recess 21 in the bottom of the mixing vessel.

In the operation of the apparatus above described the vegetables after being cooked are placed in bulk in the hopper 1. The shaft 5 is now rotated by means of the hand wheel 10 and the plunger 3 is oscillated, as above described, and at the same time the stirrer 13 is rotated in the mixing vessel. At each movement of the plunger 3 towards the screen 2 a portion of the material in the hopper is cut off from the remaining portion and forced through the screen from which it drops directly into the mixing vessel 11 where it is thoroughly mixed by the stirrer 13 with any ingredients which have been placed in the mixing vessel. The operations of mashing and mixing the vegetables are carried on simultaneously, and all of the vegetables which have been placed in the hopper are prepared for the table in a short space of time and before they have cooled to any appreciable extent. After the vegetables are thoroughly mashed and mixed the mixing vessel can be readily removed from between the side standards of the machine frame after the shaft 14 has been disconnected from the shaft 15, and the stirrer 13 can be removed from the mixing vessel.

The apparatus above described embodies the present invention in the best form which has as yet been devised, but it is to be understood that the invention is not limited thereto, and that except as defined in the claims the various features of the invention are not limited to any particular construction or arrangement of parts.

The invention having been thus described, what is claimed is:—

1. An apparatus for treating vegetables, having, in combination, a hopper, an inclined screen arranged in the lower portion of the hopper, a pivotally mounted plunger operating through the side of the hopper and acting to cut off a portion of the material in the hopper and force it through the screen and provided with a surface to support the material left in the hopper, and mechanism for continuously actuating the plunger.

2. An apparatus for treating vegetables, having, in combination, a hopper, a screen mounted in the hopper, a reciprocating plunger movable towards and from the screen and arranged to cut off a portion of the material in the hopper and force it through the screen and provided with a surface to support the material left in the hopper, a mixing vessel arranged in position to receive the material forced through the screen, a stirrer for the material in the mixing vessel, and connected mechanism for continuously reciprocating the plunger and rotating the stirrer.

In testimony whereof I affix my signature, in presence of two witnesses.

CHARLES S. KIERSTEAD.

Witnesses:
FRED O. FISH,
FARNUM F. DORSEY.